United States Patent [19]

Byrne

[11] Patent Number: 4,627,497

[45] Date of Patent: Dec. 9, 1986

[54] STOP VALVE ALARM FOR SPRINKLER SYSTEM

[75] Inventor: Barry F. Byrne, Killarney Heights, Australia

[73] Assignee: Wormald International Ltd., New South Wales, Australia

[21] Appl. No.: 837,337

[22] Filed: Feb. 28, 1986

Related U.S. Application Data

[63] Continuation of Ser. No. 470,985, Mar. 1, 1983, abandoned.

[30] Foreign Application Priority Data

Mar. 5, 1982 [AU] Australia ............................. PF2996

[51] Int. Cl.⁴ .............................................. G08B 21/00
[52] U.S. Cl. ................................... 169/23; 137/553; 137/595
[58] Field of Search .................. 169/23; 137/553, 595; 116/67 R

[56] References Cited

U.S. PATENT DOCUMENTS

| 693,320 | 2/1902 | Gray | 169/23 |
|---|---|---|---|
| 783,418 | 2/1905 | Buell | 169/23 |
| 792,258 | 6/1905 | Grinnell | 169/23 |
| 824,163 | 6/1906 | Whitney | 137/553 |
| 878,013 | 2/1908 | Nolen | 169/23 |
| 2,768,604 | 10/1956 | Enerud | 137/553 |
| 4,537,385 | 8/1985 | Bragg et al. | 137/553 |

Primary Examiner—Joseph F. Peters, Jr.
Assistant Examiner—Michael J. Forman
Attorney, Agent, or Firm—Ladas & Parry

[57] ABSTRACT

A supervisory alarm accessory for a fire sprinkler stop valve of the type including a rotatable valve actuator driving a valve spindle. The accessory contains an adaptor sleeve connectable between the actuator and the spindle to rotate with the actuator. The adaptor sleeve has an externally threaded part, and a fixed housing supported on the sleeve to permit relative rotation of the sleeve and enclosing the threaded part. A follower is threadably engaged with the threaded part and keyed to the housing. An alarm generator, and activating arrangement are supported on the housing and provide an activating connection between the alarm generator and the follower to initiate an alarm.

2 Claims, 4 Drawing Figures

STOP VALVE ALARM FOR SPRINKLER SYSTEM

This is a continuation of co-pending application Ser. No. 470,985 filed on Mar. 1, 1983 now abandoned.

This invention relates to fire sprinkler alarm systems.

BACKGROUND ART

Both local and remote alarms responding to fluctuations in water pressure are presently incorporated in sprinkler systems to indicate the activation of any part of the system and thereby provide a warning of a fire. It is common practice to provide in a readily accessible position a master stop valve to shut off the water supply to the sprinklers when the fire is extinguished. However, due to their ready accessibility unauthorised tampering with these valves does occur and the danger exists that the stop valves may be in a closed condition at a time when a fire occurs, and not only is the sprinkler system inoperative but also the alarm.

DISCLOSURE OF THE INVENTION

It is the prime object of the invention to provide an alarm device for a sprinkler system which responds to the condition of the stop valve for the system.

In accordance with one general form of the invention there is provided a fire sprinkler stop valve supervisory alarm system responsive to an at least partly closed condition of said valve and of the type including a rotatable valve actuator driving a valve spindle, said system being characterised by an adaptor sleeve connected to rotate with said actuator and having an externally threaded part, a mount carried by said sleeve, a follower threadably engaged with said threaded part to be displaceable with respect to said mount with rotation of said sleeve, an alarm generator, and a cable supported near one end on said mount and providing an activating connection between said alarm generator and said follower to initiate an alarm with predetermined displacement of said follower with respect to said mount.

BRIEF DESCRIPTION OF DRAWINGS

The invention will be described in more detail with reference to the accompanying drawings showing a preferred embodiment, and in which.

BEST MODE OF CARRYING OUT INVENTION

Figure 1:
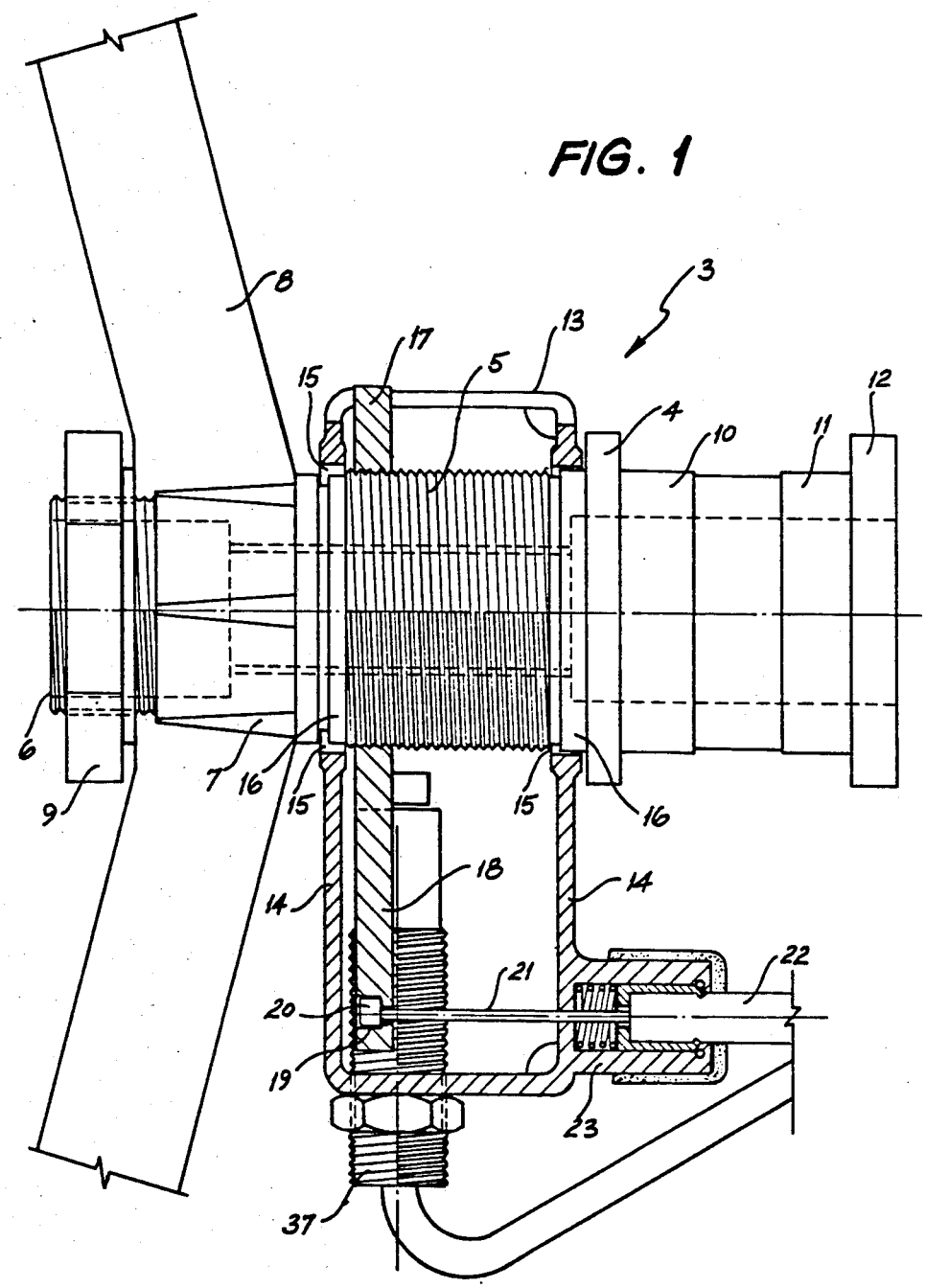
FIG. 1 is a diagrammatic representation of that portion of the alarm device assembled upon the stop valve and shown in part section
Figure 2:
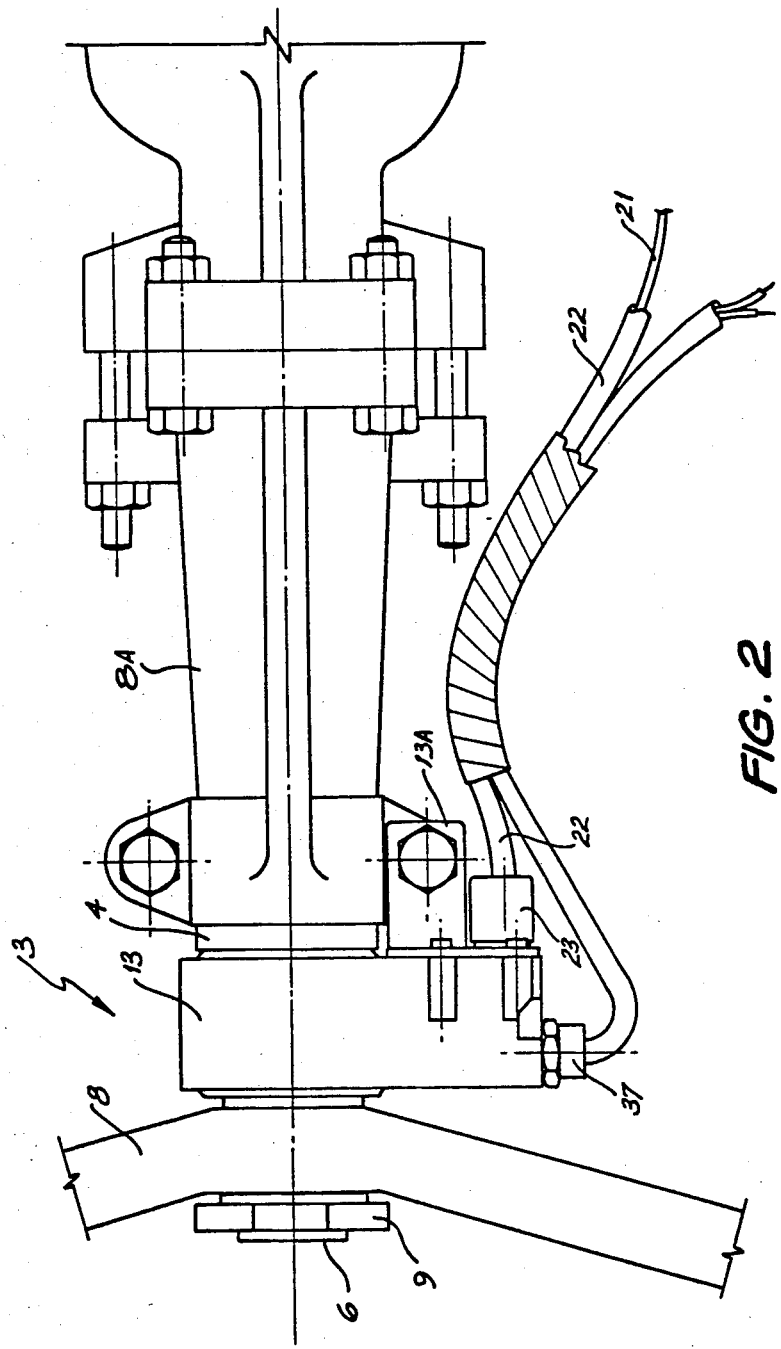
FIG. 2 shows the assembly of FIG. 1 mounted upon the housing of the valve trim and drawn to larger scale.
Figure 3:
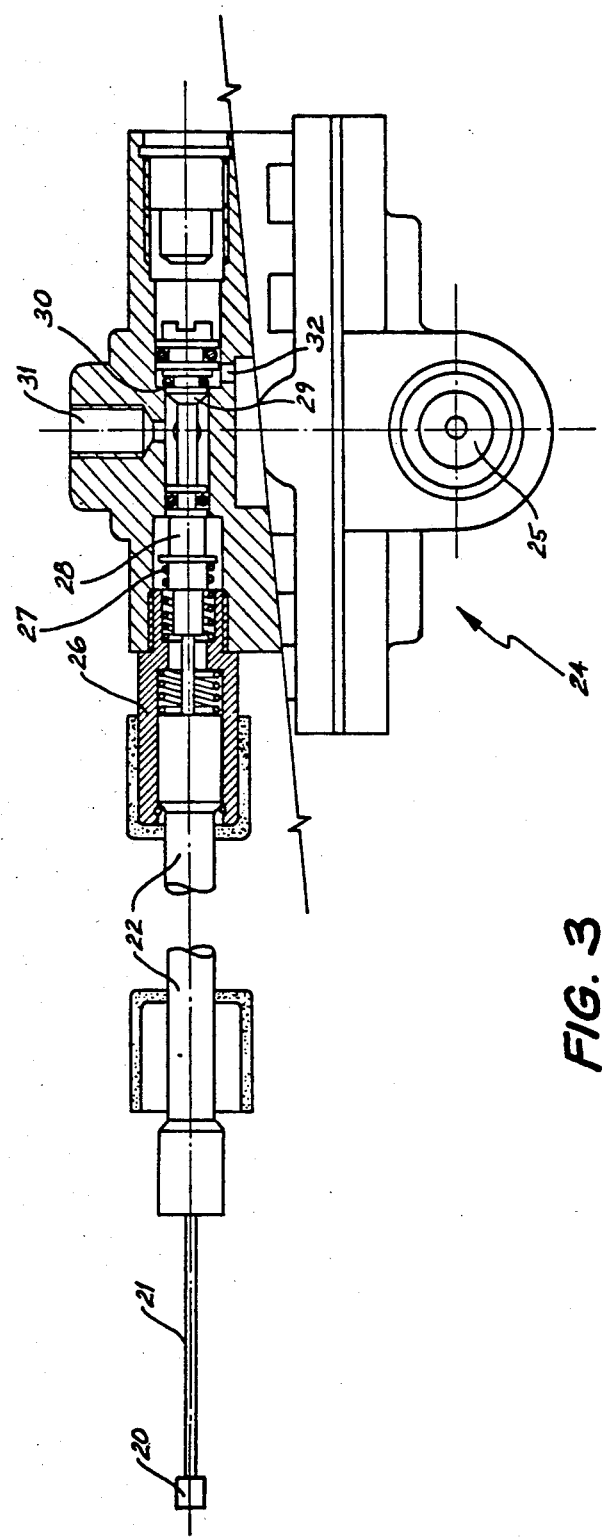
FIG. 3 is a diagrammatic representation of the remaining portion of the alarm device shown in part section.

With reference to FIGS. 1, 2 and 3 it will be noted that the alarm device 3 consists of an adaptor sleeve 4 having a centrally externally threaded portion 5. The forward end 6 of the adaptor 3 includes a conical taper 7 over which the hub of a valve handwheel 8 is tightly fitted and retained by a nut 9. The adaptor 3 is rotatably supported by bearings 10 and 11 to the valve trim frame 8A. The adaptor 3 will vary slightly in construction at its inner end 12 depending upon the type of valve trim to which it is to be applied. It is proposed that in its centrally threaded portion 5 and its outer end 6 its form will be unchanged. In every instance of use where the handwheel 8 is rotated the threaded portion 5 will also be rotated regardless of whether it is fitted to a standard or rising spindle valve.

An open-ended housing 13 having spaced side plates 14 with aligned circular openings 15 is rotatably seated by the openings 15 upon spaced bosses 16 on the adaptor 3 and to either end of the threaded portion 5. A bracket 13A fixes the housing 13 to the valve frame 8A so that the adaptor 3 rotates within the openings 15 of the housing 13. An actuator plate 17 having a threaded aperture is threaded upon the portion 5 of the adaptor 3, and has a lateral extension 18 with a keyhole slot 19 for anchoring one end 20 of a Bowden cable 21 whose sheath 22 is socketed within a hollow post 23 on the housing 13. It should be noted that in the condition of the device as shown in FIG. 1 the stop valve is in its fully opened condition and the actuator plate 17 is to the left hand end of the threaded portion 5 so that the core of the Bowden cable 21 is drawn from its sheath 22. It is shown in FIG. 1 that the housing 13 encloses the centrally threaded portion 5 of the adaptor 3.

The alarm device of the invention also incorporates a control valve 24 being of similar form to a conventional diaphragm operated hydraulic valve. The valve 24 is installed into the water pipeline (not shown) with an inlet mains connection 25 and an oppositely disposed outlet at the opposite end of the valve body for connection to the hydraulic alarm line of the sprinkler installation. Both of these connections lie at the underside of the valve 24 and beneath the internal diaphragm normally disconnecting the mains connection 25 from the alarm line connection. An end 28 of the core of the cable 21 is connected to a poppet valve 29 while the sheath 22 of the cable 21 is housed within a socket 26 and engaged by a helical spring 27 tending to displace the core of the cable 21 to the right as viewed in FIG. 1, and therefore tending to displace the valve 29 from its seat 30. The outlet 31 at the upperside of the valve 24 is connected to a drain while an inlet 32 through the other side of the valve seat 30 is connected to the water mains.

It will be appreciated, therefore, that while the actuator 17 is in the condition shown in the drawing the valve 29 will be closed so that mains pressure applied above the diaphragm disconnects the inlet mains connection 25 from the alarm line.

Figure 4:
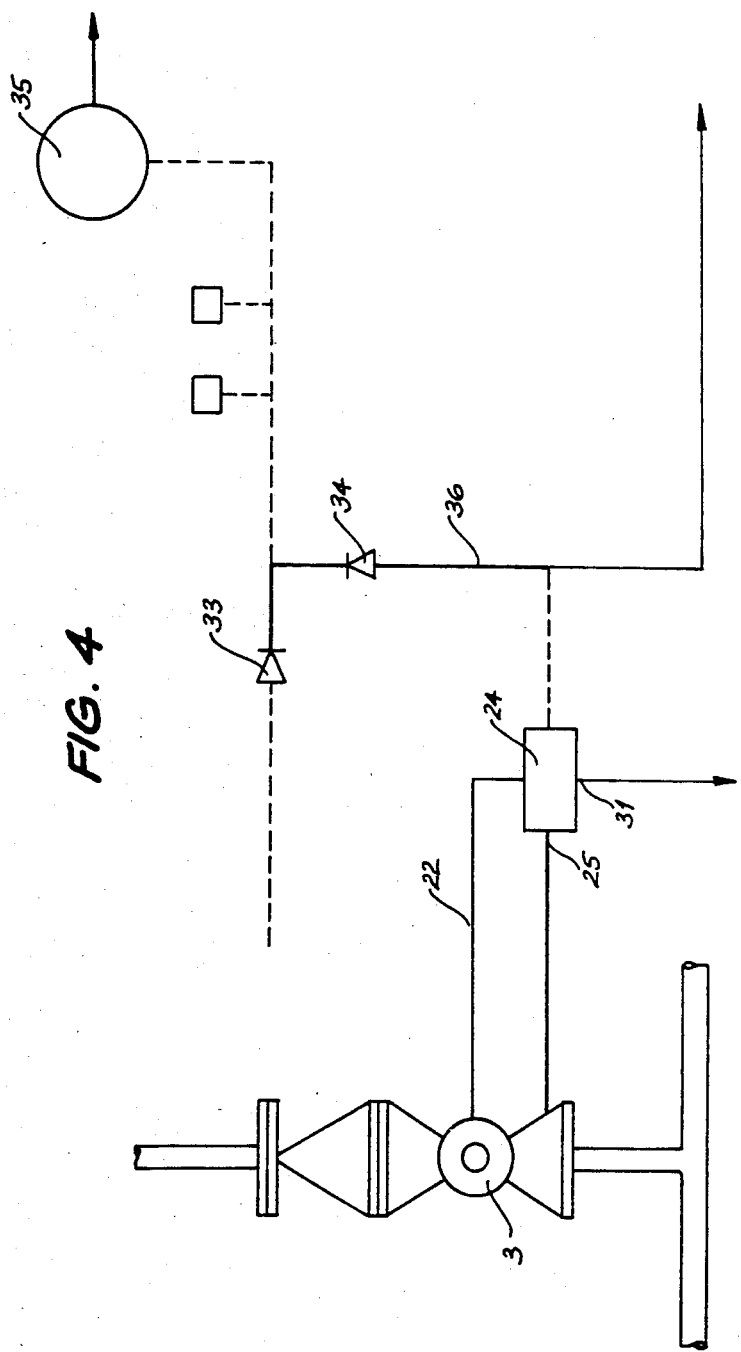
FIG. 4 is a functional schematic of the alarm device in use.

The manner of connection of the adaptor 3 and control valve 24 of the alarm device of this invention into a sprinkler system is shown in more detail with reference to FIG. 4. An existing check valve 33 will normally be connected in an existing alarm line from a valve or retard chamber (not shown) permitting activation of existing alarms, such as an audible alarm 35, whenever the sprinkler system is activated. An additional check valve 34 connected in the alarm line 36 associated with the control valve 24 will permit activation of the existing alarms 35 whenever the alarm device of the invention is activated. The control valve 24 may be so arranged that an alarm is derived either when the stop valve is closed, and hence the actuator 17 displaced a substantial distance down the threaded portion 5 or when the handwheel 8 has been rotated so that the stop valve is only partially closed. The alarm line 36 may also be connected to a separate line corresponding to the requirements at the particular installation.

An electrical proximity switch 37 (FIG. 1) may also be mounted to the housing 13 to indicate a predetermined displacement of the actuator 17 along the threaded portion 5, in order to provide local and/or remote alarms. The inclusion of the switch 37 serves to provide added security in the event of failure of response of the control valve 24 which would occur in the absence of water mains pressure. It will be observed that the alarm device is so constructed that in the event of severance of the cable 21 the valve 29 will open under the action of the bias spring 27 thereby creating an alarm condition.

A preferred embodiment has been described in the foregoing passages and it will be appreciated that other forms, modifications and refinements are possible within the scope of this invention.

What I claim is:

1. A supervisory alarm accessory for a fire sprinkler stop valve of the type including a rotatable valve actuator driving a valve spindle, said accessory comprising an adaptor sleeve connectable between said actuator and said spindle to rotate with said actuator and said adaptor sleeve having an externally threaded part, a fixed housing supported on said sleeve to permit relative rotation of said sleeve and enclosing said threaded part, a follower threadably engaged with said threaded part and keyed to said housing, said follower being linearly displaceable wihtout rotation with respect to said housing with rotation of said sleeve, an alarm generator, and activating means supported on said housing and providing an activating connection between said alarm generator and said follower to initiate an alarm with predetermined displacement of said follower with respect to said housing.

2. An accessory as claimed in claim 1, wherein said alarm generator includes a hydraulic valve assembly and said activating means comprises a mechanical actuator which is connected to a control valve and which is urged away from said follower by spring means provided with said alarm generator.

* * * * *